SHIFT REGISTERS EMPLOYING THRESHOLD GATES

Filed Jan. 31, 1967

Inventor:
KENNETH R. KAPLAN
By [signature]
Attorney

United States Patent Office 3,458,734
Patented July 29, 1969

3,458,734

SHIFT REGISTERS EMPLOYING THRESHOLD GATES

Kenneth R. Kaplan, East Brunswick, N.J., assignor to RCA Corporation, a corporation of Delaware Filed Jan. 31, 1967, Ser. No. 612,838
Int. Cl. H03k 3/26
U.S. Cl. 307—289 8 Claims

ABSTRACT OF THE DISCLOSURE

This disclosure relates to threshold logic, and more particularly to shift registers made up of threshold gates. A feature of these registers is their ability to store the old information while simultaneously receiving new information.

SUMMARY OF THE INVENTION

A stage of a shift register according to the invention includes a plurality, such as three, interconnected threshold gates. Preferably at least two of the three gates are of the weighted input type. The gates are so interconnected and biased that during one interval of a shift period an information pulse applied to the stage is received by and stored in one threshold gate while a second threshold gate continues to store the old information and to make it available to the following stage. During another interval of a shift period, the information pulse stored in the first mentioned gate is shifted into the second mentioned threshold gate leaving the first gate available for the receipt of new information.

DETAILED DESCRIPTION

The threshold gates shown in the various figures are in themselves known. The numerals within the gate indicate the respective weights accorded the inputs. Thus, in block 10 of FIGURE 1, the input B has twice as much effect on the operation of the gate as the input $x$. Such gates and circuits which may be employed to implement the gates are described in greater detail in copending application Ser. No. 547,943, by Robert O. Winder, filed May 5, 1966, and assigned to the same assignee as the present application.

Figure 1:
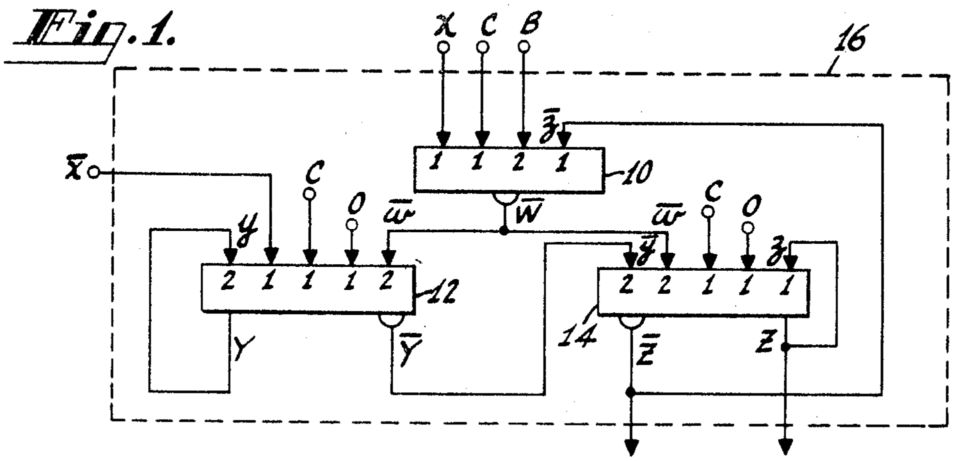
FIGURE 1 is a block diagram of one form of shift register stage according to the invention.

The shift register stage of FIGURE 1 includes three gates 10, 12 and 14. Gate 10 is a 4-input gate having respective input weights 1, 1, 2, 1 and having a threshold of 3. In other words, if three or more of the input weights represent the binary digit 1, the output $\overline{W}$ represents the binary digit 0, whereas if three or more of the input weights represent the binary digit 0, the output $\overline{W}$ represents the binary digit 1. Gate 12 is a 5-input threshold gate with respective weights 2, 1, 1, 1, 2 and having a threshold of 4. Gate 14 is a 5-input gate of the same type as gate 12. Gates 12 and 14 have both normal and complementary outputs whereas gate 10 has only a complementary output.

The gates of FIGURE 1 and of the remaining figures receive electrical signals which represent binary digits (bits) as inputs and produce electrical signals which represent binary digits as outputs. To simplify the discussion which follows, the bits themselves are sometimes referred to rather than the signals which represent the bits. Further, the small and capital letters are employed to represent both the bits and the terminals which receive the bits or from which the bits are obtained.

In the circuit of FIGURE 1, the input information bit and its complement are designated as $x$ and $\overline{x}$. The letter B represents a bias which normally has the value 0 but which momentarily is changed to the value 1 when it is desired to reset the circuit, as will be discussed shortly. The letter $\overline{Y}$ represents the information stored in response to a new bit $x$ applied to the circuit, under certain conditions. The letter $z$ represents the previous bit stored during the time a new bit is being received.

In the operation of the circuit of FIGURE 1, during the time it is desired to shift the information temporarily stored in gate 12 into gate 14, $B=0$ and $c=0$. When B and $c$ both equal 0, three of the five input weights to gate 10 are 0 and $\overline{W}=1$, regardless of the values of $x$ and $\overline{z}$. When $\overline{W}=1$, the effect of this signal at gate 12 is cancelled by the two zeros ($c=0$ and bias=0) applied to gate 12. Gate 12 therefore operates in the same manner as a threshold gate having three input weights and a threshold of 2. Of these three weights, the feedback signal $y$ has a weight of 2 so that regardless of the value of $\overline{x}$ the output of gate 12 is $Y=y$. In other words, when $c=0$ and $B=0$, gate 12 is unaffected by the value of $\overline{x}$.

During this same period, the $\overline{W}=1$ input to gate 14 (having a weight of 2) is cancelled by the combined effect of the $c=0$ (weight 1) and the bias=0 (weight 1) inputs to gate 14. Of the remaining three weights, $\overline{y}$ has the weight 2 so that the output produced by gate 14 must be $Z=\overline{y}$. In other words, the bit $\overline{y}$ stored in gate 12 is shifted into stage 14.

The operation above is succinctly described by the following three Boolean equations:

$$\overline{W}=1 \quad (1)$$

$$Y=y \quad (2)$$

$$Z=\overline{y} \quad (3)$$

During the time it is desired to receive new information, B retains the value of 0 and $c$ is charged to 1. Under this set of conditions, the following three Boolean equations describe the circuit operation. In these equations and also in Equations 1, 2 and 3 above, the small letters represent the former values of the respective bits and the capital letters represent the new value of the respective bits.

$$\overline{W}=\overline{x\cdot\overline{z}}=\overline{x}+z \quad (4)$$

$$Y=\mathrm{MAJ}(y,\overline{x},\overline{W}) \quad (5)$$

$$Z=\mathrm{MAJ}\ (\overline{Y},\overline{W},z) \quad (6)$$

The operation depicted by the equations above is shown also in Table I below.

TABLE I

| | B | c | x | z | $\overline{W}$ | Y | Z |
|---|---|---|---|---|---|---|---|
| (1) | 0 | 0 | 0 | 0 | 1 | 1 | 0 |
| (2) | 0 | 0 | 1 | 0 | 1 | 1 | 0 |
| (3) | 0 | 0 | 0 | 1 | 1 | 0 | 1 |
| (4) | 0 | 0 | 1 | 1 | 1 | 0 | 1 |
| (5) | 0 | 1 | 0 | 0 | 1 | 1 | 0 |
| (6) | 0 | 1 | 1 | 0 | 0 | 0 | 0 |
| (7) | 0 | 1 | 0 | 1 | 1 | 1 | 1 |
| (8) | 0 | 1 | 1 | 1 | 1 | 0 | 1 |

It may be observed from the table that when both B and $c$ are 0, $Y=y$ and $Z=\overline{y}$ regardless of the value of $x$. In other words, the information formerly stored in gate 12, that is, *y*, is equal to the information presently stored in gate 12, that is, Y. Further, this information is shifted into stage 14 and is stored there as $Z=\overline{y}$.

Lines 5 to 8 of the table illustrate the circuit operation when $B=0$ and $c=1$. It may be seen that regardless of the value of *x*, the value of Z remains unaffected (in each line $Z=z$). It may also be observed that when $x\neq Z$, and $c=1$, then $\overline{Y}$ becomes equal to *x* (lines 6 and 7). In other words, the incoming information *x* is stored as $\overline{Y}=x$.

Table II below illustrates the operation of the shift register stage of FIGURE 1 for various input conditions. The Greek letter $\phi$ represents a "don't care" condition, that is, the digit may have either binary value 1 or 0.

TABLE II

| | B | c | x | z | $\overline{W}$ | Y | Z |
|---|---|---|---|---|---|---|---|
| 1 | | | | | 0 | 0 | 1 |
| 2 | 0 | 0 | $\phi$ | 1 | 1 | 0 | 1 |
| 3 | 0 | 1 | 0 | 1 | 1 | 1 | 1 |
| 4 | 0 | 0 | $\phi$ | 1 | 1 | 1 | 0 |
| 5 | 0 | 1 | 1 | 0 | 0 | 0 | 0 |
| 6 | 0 | 0 | $\phi$ | 0 | 1 | 0 | 1 |
| 7 | 0 | 1 | 1 | 1 | 1 | 0 | 1 |
| 8 | 0 | 0 | $\phi$ | 1 | 1 | 0 | 1 |
| 9 | 0 | 1 | 0 | 1 | 1 | 1 | 1 |
| 10 | 0 | 0 | $\phi$ | 1 | 1 | 1 | 0 |
| 11 | 0 | 1 | 0 | 0 | 1 | 1 | 0 |
| 12 | 1 | 0 | $\phi$ | 0 | 0 | 0 | 0 |
| 13 | 0 | 0 | $\phi$ | 0 | 1 | 0 | 1 |
| 14 | 1 | 0 | 1 | 1 | 0 | 0 | 0 |
| 15 | 0 | 0 | $\phi$ | 0 | 1 | 0 | 1 |
| 16 | 1 | 0 | 0 | 1 | 1 | 0 | 1 |
| 17 | 0 | 0 | $\phi$ | 1 | 1 | 0 | 1 |

The initial condition assumed in Table II is $\overline{W}YZ=001$. If B and *c* are 0 and *z* is 1 as shown in line 2, $\overline{W}$YZ changes to 101. In other words, the Y and Z bits are not affected. Line 3 depicts what occurs when *c* changes to 1. Now the $x=0$ bit is stored as $\overline{Y}=0$. The bit $z=1$ continues to be stored. In line 4 of the table, *c* is changed back to 0, the bit stored as $\overline{Y}=0$ is now shifted into stage 14 and stored there as $z=0$.

In line 5, the input information is changed to $x=1$ and *c* has again changed to 1. The information $x=1$ is stored as $\overline{Y}=1$, $Y=0$. The stored bit $z=0$ is unaffected.

At this point it may be worthwhile, for purposes of explanation, to follow the operation of the circuit of FIGURE 1 to see how the various values in line 5 are obtained. Initially, $\overline{W}YZ=110$ (see line 4 of the table). Now *c* (line 5) becomes 1 and *x* becomes 1. $\overline{z}$ is also 1 so that three of the five input weights to gate 10 are 1 and $\overline{W}$ changes to 0. Referring now to gate 12, $\overline{W}=0$, the bias=0 and $\overline{x}=0$ so at least four of the seven input weights are 0. Accordingly, Y changes to 0.

Referring now to gate 14, initially $\overline{y}=0$ which, added to the bias=0 and $c=0$, causes *z* to be 0. Now $\overline{W}=0$, bias=0 and $z=0$ so that Z is still equal to 0. Therefore, gate 14 must continue to store the previous information, that is, $Z=z$.

Lines 12–17 show how the circuit may be reset unconditionally to $\overline{Z}=0$. If $z=0$ initially, when B is changed to 1, three of the five input weights to gate 10 are 1 so that $\overline{W}$ becomes 0. Four of the seven input weights to gate 12 become 0 so that Y becomes 0. Four of the input weights to gate 14 become 0 so that Z remains 0. All of this is shown in line 12. Now when B is changed back to 0 (line 13), $\overline{W}$ changes unconditionally to 1. The $\overline{Y}=1$ stored in gate 12 is shifted into gate 14 as $Z=1$. The circuit is now in its reset state of $\overline{W}YZ=101$. The above resetting takes place regardless of the value of *x*.

If *z* is initially a 1, the same thing occurs. First, assume $x=1$ as shown in line 14. When B is made 1, $\overline{W}$ changes to 0. Y, which previously was a 0, remains a 0. When B is changed back to 0 (line 15), regardless of the value of *x*, the circuit is placed in its reset state of $\overline{W}YZ=101$. Now assume that *x* initially is a 0 as shown in line 16. When B becomes 1 (same line) $\overline{W}$ remains 1. At gate 12, $\overline{W}=1$ is cancelled by the combined effect of bias=0 and $c=0$ so that $Y=y=0$. At gate 14, $\overline{Y}=1$ and $\overline{W}=1$ so that $Z=z=1$. When B changes back to 0 (line 16), it is clear that the circuit remains in its reset state $\overline{W}YZ=101$.

Figures 2, 3:
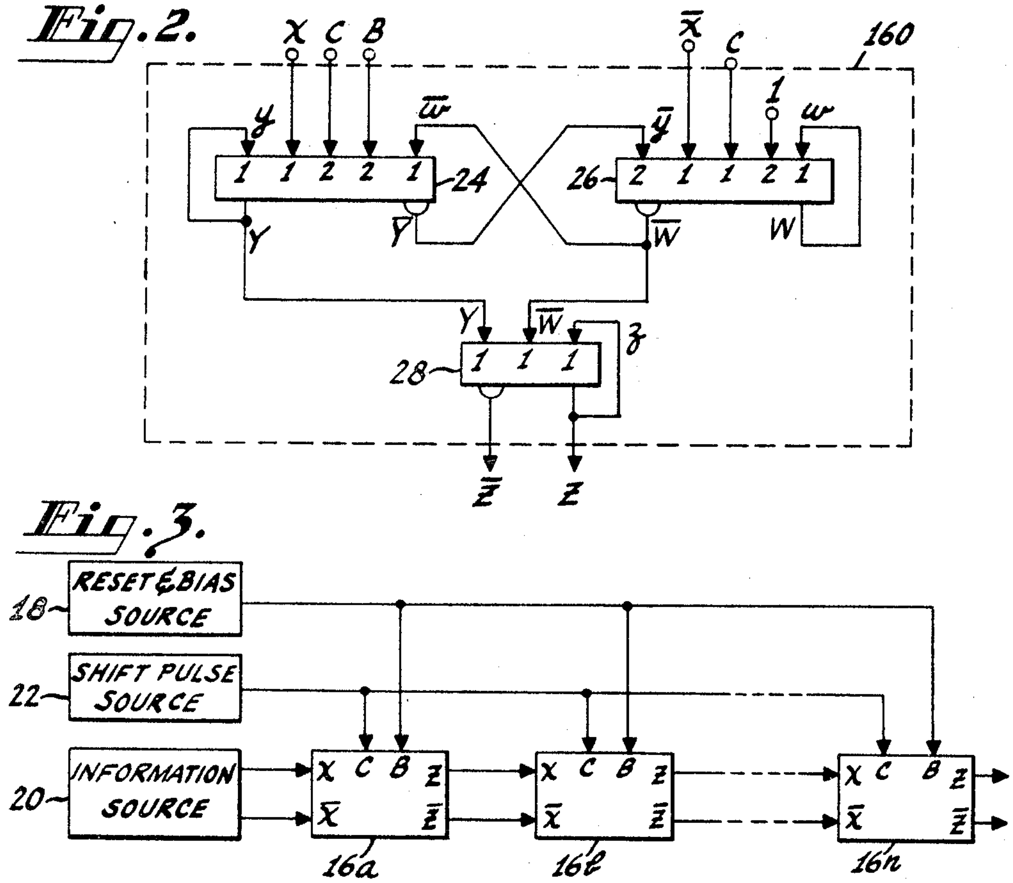
FIGURE 2 is a block diagram of a second form of shift register stage according to the invention.
FIGURE 3 is a block diagram of a shift register according to the invention which may be implemented either with the stages of FIGURE 1 or with the stages of FIGURE 2.

A shift register employing the shift register stages of FIGURE 1 is shown in FIGURE 3. The stages **16*a* through 16*n* are all identical to the circuit within the dashed block 16 of FIGURE 1. The reset and bias source 18 normally applies a signal indicative of a 0 to the B input terminals of the stages. When it is desired to reset the register, B changes from 0 to 1 to 0 in the manner already discussed. The shift pulse source 22** applies shift pulses *c* as already discussed.

The operation of the register of FIGURE 3 should be clear from the explanation already given of FIGURE 1. Further, as should be clear, the register can be operated as a ring counter by connecting the Z and $\overline{Z}$ outputs of the last stage **16*n*** to the *x* and $\overline{x}$ inputs, respectively, of the first stage **16*a***. This configuration is operative with an odd or an even number of stages.

A second form of shift register stage according to the invention is shown in FIGURE 2. This stage consists of three threshold gates 24, 26 and 28. Gate 24 is a 5-input gate with input weights 1, 1, 2, 2, 1, respectively, and a threshold of 4; gate 26 is of the same type as gate 24; gate 28 is a simple 3-input majority gate, that is, each input has the weight 1 and the gate has a threshold of 2.

In the operation of the circuit of FIGURE 2, B normally represents the bit 1. When *c* is also 1, at least four of the seven input weights to gate 24 are 1 so that $Y=1$. Three of the input weights to gate 26 are 1 ($c=1$ and the bias of weight $2=1$) and two of the input weights represent the bit 0 ($\overline{Y}=0$). Therefore, the output W is a 1 only if $\overline{x}=1$ or $w=1$. As $Y=1$, the output of gate 28 is a 1 either if $\overline{W}$ is 1 or *z* is 1.

The operation described in words above is more succinctly described in Boolean Equations 7, 8 and 9 below. It can also be shown that when $c=0$ and $B=1$, Equations 10, 11 and 12 below describe the circuit operation.

When $B=1$; $c=1$:

$$Y=1 \quad (7)$$

$$W=\overline{x}+w \quad (8)$$

$$Z=\overline{W}+z \quad (9)$$

When $B=1$; $c=0$:

$$Y=\mathrm{Maj}(y,x,\overline{w}) \quad (10)$$

$$W=\overline{y}+\overline{x}w \quad (11)$$

$$Z=\mathrm{Maj}(Y,\overline{W},z) \quad (12)$$

The operation of the circuit of FIGURE 2 is also shown in Table III below. This table assumes different input conditions for *x* and different values of *z*.

TABLE III

| B | c | x | z | Y | W | Z |
|---|---|---|---|---|---|---|
| 1 | 0 | 0 | 0 | $y\cdot\overline{w}$ | $\overline{y}+w$ | $Y\cdot W$ |
| 1 | 0 | 1 | 0 | $y+\overline{w}$ | $\overline{y}$ | $Y\cdot W$ |
| 1 | 0 | 0 | 1 | $y\cdot\overline{w}$ | $\overline{y}+w$ | $Y+W$ |
| 1 | 0 | 1 | 1 | $y+\overline{w}$ | $\overline{y}$ | $Y+W$ |
| 1 | 1 | 0 | 0 | 1 | 1 | 0 |
| 1 | 1 | 1 | 0 | 1 | 1 | 0 |
| 1 | 1 | 0 | 1 | 1 | 1 | 1 |
| 1 | 1 | 1 | 1 | 1 | 0 | 1 |

The operation of the circuit of FIGURE 2 is also described in Table IV below.

TABLE IV

| | B | c | x | z | Y | W | Z |
|---|---|---|---|---|---|---|---|
| 1 | | | | | 1 | 0 | 1 |
| 2 | 1 | 1 | 0 | 1 | 1 | 1 | 1 |
| 3 | 1 | 0 | 0 | 1 | 0 | 1 | 0 |
| 4 | 1 | 1 | 0 | 0 | 1 | 1 | 0 |
| 5 | 1 | 0 | 0 | 0 | 0 | 1 | 0 |
| 6 | 1 | 1 | 1 | 0 | 1 | 1 | 0 |
| 7 | 1 | 0 | 1 | 0 | 1 | 0 | 1 |
| 8 | 1 | 1 | 1 | 1 | 1 | 0 | 1 |
| 9 | 1 | 0 | 1 | 1 | 1 | 0 | 1 |
| 10 | 0 | 0 | $\phi$ | 0 | 0 | 1 | 0 |
| 11 | 1 | 0 | $\phi$ | 0 | 0 | 1 | 0 |
| 12 | 0 | 0 | $\phi$ | 1 | 0 | 1 | 0 |
| 13 | 1 | 0 | $\phi$ | 1 | 0 | 1 | 0 |

To aid the reader in following the circuit operation a number of lines in the tables will be discussed and their significance pointed out. Line 1 in Table IV is the assumed starting condition of the circuit: $YWZ=101$. Line 2 of the table shows what occurs when $B=1$, $c=1$, $x=0$, $z=1$. Under this set of conditions, Y becomes 1 because at least four of the seven input weights to gate 24 are 1. As the bias is 1, $\overline{x}=1$ and $c=1$, four of the seven input weights to gate 26 are 1 so that $\overline{W}$ becomes 0 and W becomes 1. Gate 28 receives inputs $Y=1$, $\overline{W}=0$ and $z=1$ so that the output remains $z=1$.

Line 3 shows what occurs when $c$ changes to 0 and all other input conditions remain the same. Now $\overline{w}$, $c$ and $x$ are all 0, so that four of the seven input weights to gate 24 are 0 and Y changes to 0. The output W remains 1 as $w$, the bias and $\overline{x}$ are all 1 and these three inputs have a total weight of 4. As $\overline{W}=0$ and $Y=0$, Z becomes 0. Thus, lines 2 and 3 of the table indicate when $x$, the new input, is unlike $z$, the stored input, and $x=0$ and $z=1$, that during the first interval of a shift period $x$ is stored as $\overline{w}$ and during the second interval of the shift period $\overline{w}$ is shifted into stage 28 and is stored as $Z=x$.

Lines 4 and 5 of the table can be derived either by following the operation of the circuit of FIGURE 2 as discussed above or from the Boolean equations and/or Table III. They show that when $z=x=0$, the stored information is the same at the end of the shift period as it was before the start of the shift period. During the first interval Y temporarily changes to 1 but during the second interval the original information stored, $YWZ=010$, continues to be stored.

Lines 6 and 7 of Table IV indicate some of the things which occur when the new input information $x=1$ is unequal to the stored information $z=0$. During a first interval of the shift period, W and Z remain unchanged and Y changes to 1. One gate delay interval (gate 26) after $c$ becomes 0, W changes to 0 because $\overline{y}=0$, $\overline{x}=0$ and $c=0$. However, after this short interval and before the change to $Z=1$ occurs, the circuit state (not shown in Table IV) is $YWZ=100$, so that the bit $x=1$ is stored temporarily as $\overline{W}=1$ or $W=0$. After the delay imparted by gate 28, Z changes to 1 as $\overline{W}$ and Y are both 1, so that the new circuit state is $YWZ=101$, all as shown in line 7.

Lines 8 and 9 of Table IV indicate that when the new information $x=1$ is the same as the stored information $z=1$, the stored information is unaffected.

Lines 10–13 show how the circuit of FIGURE 2 may be reset. In this resetting operation, the value of $x$ does not matter. If B is initially changed to 0, while $c$ is held at 0, regardless of the previous condition of the circuit of FIGURE 2, the circuit stores $YWZ=010$. If B is now changed back to 1 while $c$ is maintained at 0, the circuit retains is reset state $YWZ=010$.

The connection of the stages of FIGURE 2 as a shift register is the same as is shown in FIGURE 3. However, now each of the stages **16*a* through 16*n* represents the three gates within block 160 of FIGURE 2. The stage 18 in FIGURE 3 now normally provides a bias $B=1$. However, during a reset operation B is changed from 1 to 0 and then back to 1 all during the time the shift pulse source 22** supplies a 0. Each shift period consists of a first interval during which the shift pulse represents a 1 and a second interval during which the shift pulse represents a 0.

The circuits of FIGURES 1 and 2 each have their advantages. The circuit of FIGURE 1, for example, is insensitive to the value of $x$ as soon as $c$ becomes 0. The circuit of FIGURE 2 does not have this attribute, however, it is faster than the circuit of FIGURE 1 and is somewhat simpler. In the circuit of FIGURE 2, $x$, the input, remains at its given value during the interval that $c=1$ and one gate delay interval after $c$ is returned to 0. However, with this limitation, the structure of the stage of FIGURE 2 becomes more symmetrical than the stage of FIGURE 1 and the circuit can be shifted at a faster rate than the circuit of FIGURE 1. The reason the circuit of FIGURE 2 is faster than the circuit of FIGURE 1 is that Z, the output, changes in response to a new input condition after only two stage delays in the worst case in the circuit of FIGURE 2 whereas in the circuit of FIGURE 1 Z changes, in the worst case, after three stage delays.

While for purposes of convenience the various gates with permanent biases of the circuits of this invention are shown to have input terminals to which these biases are applied, it is to be understood that such bias terminals need not be brought out to the "outside world" and in fact need not even be physically present. To illustrate, a four-input 2, 2, 1, 1 threshold gate with no bias and with a threshold of four is the logical equivalent of the five input 2, 2, 1, 1, 1 gate 14 of FIGURE 1 which has a threshold of four and permanent bias 0 applied to one of the weight one of the weight one input terminals. As another example, a four-input 2, 1, 1, 1 threshold gate with a threshold of two and no permanent bias is the logical equivalent of the five input gate 26 of FIGURE 2 having input weights 2, 2, 1, 1, 1 and a permanent bias of 1 applied to a weight two input terminal. A number of other logical equivalents are also possible as understood by those skilled in this art and it is intended that the claims cover such equivalents.

What is claimed is:

1. A shift register stage consisting solely of three interconnected threshold gates each for storing a signal, at least two of the gates comprising weighted input, biased gates, each producing an output signal indicative of the signal stored in said gate and the complement of said output signal; means for applying a shift signal to at least said two gates; means for applying an information signal to one of the three gates and its complement to another of the three gates; and means, during a shift period, responsive to said input information signal when it is not equal in value to the signal stored in a particular one of said three gates for first temporarily storing said input information signal in a second of said three gates and then shifting said temporarily stored signal into said particular one of said three gates.

2. A shift register stage as set forth in claim 1 in which the complementary output of one of the three gates serves as a weighted input to at least one other of the gates.

3. A shift register stage as set forth in claim 1 in which the complementary output of each gate is applied to at least one other gate.

4. A shift register stage as set forth in claim 1 in which the complementary output of each of two weighted input gates is applied as an input to the other weighed input gate.

5. A shift register stage as set forth in claim 1 wherein first and second of said three gates are 2, 2, 1, 1, 1 gates with a threshold of 4 and the third of said three gates is a 2, 1, 1, 1 gate with a threshold of 3; a connection from the complementary output signal terminal of the first gate to a weight 1 input terminal of the third gate; a connection from the uncomplemented output terminal of the first gate to a weight 1 input terminal to said first gate; a connection from the complementary output terminal of said second gate to a weight 2 input terminal to said first gate; a connection from the uncomplemented output terminal of said second gate to a weight 2 input terminal of said second gate; a connection from the complementary output terminal of said third gate to weight 2 input terminals of said first and second gates; means for applying said input information signal to a weight 1 input terminal to said third gate and its complement to a weight 1 input terminal to said second gate; means for applying said shift signal to weight 1 input terminals of all three gates; means for applying a 0 bias to weight 1 input terminals to said first and second gates; and means for applying a bias which normally has the value 0 but which may be switched to the value 1 to the weight 2 input terminal of said third gate.

6. A shift register stage as set forth in claim 1 wherein first and second of said three gates are 2, 2, 1, 1, 1 gates with a threshold of 4 and the third of said three gates is a 1, 1, 1 gate with a threshold of 2; a connection from the complementary output signal terminal of the first gate to a weight 2 input terminal of the second gate; a connection from the uncomplemented output terminal of the first gate to a weight 1 input terminal to said first and third gates; a connection from the complementary output terminal of said second gate to a weight 1 input terminal to said first and third gates; a connection from the uncomplemented output terminal of said second gate to a weight 1 input terminal of said second gate; a connection from the uncomplemented output terminal of said third gate to an input terminal of the same gate; means for applying said input information signal to a weight 1 input terminal to said first gate and its complement to a weight 1 input terminal to said second gate; means for applying said shift signal to a weight 2 input terminal of said first gate and a weight 1 input terminal of said second gate; means for applying a 1 bias to a weight 2 input terminal of said second gate; and means for applying a bias which normally has the value 1 but which may be switched to the value 0 to a weight 2 input terminal of said first gate.

7. A shift register stage consisting solely of three interconnected threshold gates, two of the gates comprising 5 input, 2, 2, 1, 1, 1 gates with a threshold of four each producing an output signal and its complement, the first receiving a signal at a weight 1 input terminal thereof and the second the complement of the signal at a weight 1 input terminal thereof, and the third gate comprising a 3-input, 1, 1, 1 gate, with a threshold of two, and producing at least an uncomplemented output signal; means for applying a shift signal to a weight 2 input terminal of the first gate and to a weight 1 input terminal of the second gate; means for applying a bias of 1 to a weight 2 input terminal of the first and second gates; means for applying the complementary output signal of the first gate to a weight 2 input terminal of the second gate; means for applying the complementary output signal of the second gate to weight 1 input terminals to the first and third gates; means for applying the uncomplemented output of each gate to a weight 1 input terminal of the same gate; and means for applying the uncomplemented output of the first gate to the third input terminal of the third gate.

8. A shift register stage consisting solely of three interconnected threshold gates, two of the gates comprising 5 input, 2, 2, 1, 1, 1 gates with a threshold of four, each producing an output signal and its complement, the first receiving the complement of an input signal at a weight 1 input terminal thereof, and the third gate comprising a 4-input 2, 1, 1, 1 gate, with a threshold of three, and producing at least a complemented output signal and said third gate receiving said input signal at a weight 1 input terminal thereof; means for applying a shift signal to a weight 1 input terminal of all three gates; means for applying a bias of 0 to weight 1 input terminals to the first and second gates and to the weight 2 input terminal to the third gate; means for applying the complementary output signal of the first gate to a weight 2 input terminal of the second gate; means for applying the complementary output signal of the second gate to a weight 1 input terminal to the third gate; means for applying the complementary output signal of the third gate to weight 2 input terminals of the first and second gates; and means for applying the uncomplemented output of the first gate to a weight 2 input terminal of the same gate and the uncomplemented output of the second gate to a weight 1 input terminal to the second gate.

References Cited

UNITED STATES PATENTS

| | | | |
|---|---|---|---|
| 3,403,267 | 9/1968 | Winder | 307—211 XR |
| 3,253,158 | 5/1966 | Horgan | 307—221 XR |

ARTHUR GAUSS, Primary Examiner

JOHN ZAZWORSKY, Assistant Examiner

U.S. Cl. X.R.

307—211, 221; 328—37

PO-1050
(5/69)

UNITED STATES PATENT OFFICE
CERTIFICATE OF CORRECTION

Patent No. 3,458,734 Dated July 29, 1969

Inventor(s) Kenneth R. Kaplan

It is certified that error appears in the above-identified patent and that said Letters Patent are hereby corrected as shown below:

| | | |
|---|---|---|
| Column 2 | line 45 | "charged" should be --changed-- |
| Column 2 | line 52 | Equation (4) "$\bar{W}=x.\bar{z}=\bar{x}+z$" should be --$\bar{W}=\overline{x\cdot\bar{z}}=\bar{x}+z$-- |
| Column 4 | line 45 | "$\bar{x}=1$ of $w=1$" should be --$\bar{x}=1$ or $w=1$-- |
| Column 5 | line 75 | "is" should be --its-- |

SIGNED AND SEALED

OCT 28 1969

(SEAL)
Attest:

Edward M. Fletcher, Jr.
Attesting Officer

WILLIAM E. SCHUYLER, JR.
Commissioner of Patents